US012595524B2

(12) United States Patent
Wagner et al.

(10) Patent No.: US 12,595,524 B2
(45) Date of Patent: Apr. 7, 2026

(54) INDUCTION HARDENING SYSTEM

(71) Applicant: AKTIEBOLAGET SKF, Gothenburg (SE)

(72) Inventors: Gerhard Wagner, Prichsenstadt (DE); Fred Menig, Sulzthal (DE); Martina Sticht, Sennfeld (DE); Michael Wendel, Bremen (DE)

(73) Assignee: AKTIEBOLAGET SKF, Gothenburg (SE)

( * ) Notice: Subject to any disclaimer, the term of this patent is extended or adjusted under 35 U.S.C. 154(b) by 395 days.

(21) Appl. No.: 18/091,468

(22) Filed: Dec. 30, 2022

(65) Prior Publication Data

US 2023/0220506 A1 Jul. 13, 2023

(30) Foreign Application Priority Data

Jan. 13, 2022 (DE) ......................... 102022200322.5

(51) Int. Cl.
*C21D 1/42* (2006.01)
*C21D 1/18* (2006.01)
(Continued)

(52) U.S. Cl.
CPC ................ *C21D 1/42* (2013.01); *C21D 1/18* (2013.01); *C21D 9/40* (2013.01); *H05B 6/101* (2013.01); *H05B 2206/02* (2013.01)

(58) Field of Classification Search
CPC ... C21D 1/42; C21D 1/18; C21D 9/40; C21D 1/10; C21D 9/32; H05B 6/101;
(Continued)

(56) References Cited

U.S. PATENT DOCUMENTS 4,701,584 A * 10/1987 Rylicki .................. H05B 6/101 219/652
4,778,971 A 10/1988 Sakimoto et al.
(Continued)

FOREIGN PATENT DOCUMENTS

DE 102016104214 * 9/2017 ............. H05B 6/104
DE 102016104214 A1 9/2017
(Continued)

OTHER PUBLICATIONS

DE102016104214, Kaiser et al. Device For Inductive Heating Of A Metallic Workpiece, Sep. 14, 2017 (Year: 2017).*
(Continued)

*Primary Examiner* — Jessee R Roe
*Assistant Examiner* — Michael Aboagye
(74) *Attorney, Agent, or Firm* — J-TEK LAW PLLC; Scott T. Wakeman; Mark A. Ussai

(57) ABSTRACT

An induction hardening system for inductively hardening a component includes a first inductor group with at least two inductors configured to heat a region to be hardened on the component, a drive unit configured to move the component along the at least two inductors, and a generator. The at least two inductors are electrically energized by the generator, and the generator is configured to send a current of a same frequency and a same strength to the at least two inductors of the first inductor group.

14 Claims, 5 Drawing Sheets

(51) Int. Cl.
*C21D 9/40* (2006.01)
*H05B 6/10* (2006.01)

(58) Field of Classification Search
CPC ........ H05B 2206/02; H05B 6/40; H05B 6/06; H05B 6/02; H05B 6/36; H05B 6/04; Y02P 10/25
USPC .......... 266/129; 148/575; 219/672, 673, 674
See application file for complete search history.

(56) References Cited

U.S. PATENT DOCUMENTS

| | | | | |
|---|---|---|---|---|
| 4,855,551 | A * | 8/1989 | Mucha | C21D 9/32 266/125 |
| 7,087,869 | B2 * | 8/2006 | Eguchi | H05B 6/06 219/676 |
| 7,648,600 | B2 * | 1/2010 | Tanaka | C21D 1/42 148/575 |
| 9,534,267 | B2 * | 1/2017 | Tanaka | C21D 9/40 |
| 10,406,581 | B2 * | 9/2019 | Okada | H05B 6/104 |
| 2009/0159157 | A1 | 6/2009 | Tanaka et al. | |

FOREIGN PATENT DOCUMENTS

| | | | |
|---|---|---|---|
| DE | 102018212771 | A1 | 2/2020 |
| DE | 102018212773 | A1 | 2/2020 |
| DE | 102018212778 | A1 | 2/2020 |
| DE | 102018212782 | A1 | 2/2020 |

OTHER PUBLICATIONS

DE102016104214, Kaiser et al. Device For Inductive Heating Of A Metallic Workpiece, Sep. 14, 2017, Espacenet machine translation (Year: 2017).*

Office Action from the German Patent Office dispatched Oct. 13, 2022 in related German application No. 10 2022 200 322.5, and translation thereof.

* cited by examiner

INDUCTION HARDENING SYSTEM

CROSS-REFERENCE

This application claims priority to German patent application no. 10 2022 200 322.5 filed on Jan. 13, 2022, the contents of which are fully incorporated herein by reference.

TECHNOLOGICAL FIELD

The present disclosure is directed to an induction hardening system that includes a single generator for powering multiple inductors.

BACKGROUND

Components such as bearing rings that are exposed to particularly high loads are usually, in addition to being designed with a special steel composition that is designed for the relevant requirements, also hardened on their surface or even completely.

In order to achieve such an increased hardness, the component must be heated in the region to be hardened to above the so-called austenitization start temperature (As temperature), starting from which a phase transition from ferrite to austenite occurs. Depending on the steel composition, microstructural condition, and/or heating speed, this temperature can fall in the range between 700° C. and 1100° C. After the heating, the component or the region to be hardened is brought as quickly as possible to a temperature below the martensite start temperature (Ms temperature), starting from which the austenite formed by the prior heating transforms into martensite. This temperature can fall between 500° C. and 100° C., and is also dependent on the steel composition, the austenitization conditions and the microstructural condition.

Various methods can be used here. Among these methods, thermal methods are used in which the microstructure of the steel is changed by a heat treatment so that the component has an increased hardness at least in partial regions. One of these hardening methods is inductive hardening, a method in which a current-carrying coil is brought to a certain distance from the component (coupling distance) so that a current is induced in the component to heat the component. Here the induction coil can completely or partially surround the component, and/or, in particular for large-surface applications, be moved relative to the component to harden the entire component or a partial region of thereof.

This method in which only a part of the component is heated by an inductor may be referred to as progressive hardening or pulse hardening, is based on a successive hardening of individual sections of the component where the inductor and the component are moved relative to each other. In the case of progressive hardening, the heated site is usually quenched directly after the passage of the inductor with a quenching sprinkler following the inductor, while in the case of pulse hardening the site to be hardened is repeatedly traversed by the inductor and is only quenched after multiple repeated heatings.

However, it is disadvantageous with the known hardening methods that the inductor must be adapted to the size or shape of the component in order to produce a sufficient hardness. When large numbers of components need to be hardened, these costs are amortized for the manufacture of a particular inductor; however, with larger components and for small batch sizes, the tooling costs are too high to make such methods economical. A further disadvantage with progressive hardening systems is that in the start and end zone of the inductor a so-called slip arises, a region with a soft zone or a zone of reduced hardness, which is not acceptable. The slip can be avoided with the so-called slipless hardening, which, however, cannot be economically reproduced with small batch sizes.

However, especially the heat input and the distribution of the heat input in the component is of enormous importance in order to achieve the desired component properties in the treatment zones and to control the resulting dimensional and shape changes (component distortion). Known possibilities for influencing the heat input and the temperature distribution in the case of an inductive hardening are a suitable choice of the process parameters or of the process design (electrical power, heating time, heating frequency, inductor-component coupling distance, inductor material, inductor design, targeted use of magnetic field concentrators, component material, previous condition of the component material, relative speed of the component with respect to the inductor, etc.) Thus the inductors and the entire electrical oscillating circuit including generators, inverters, capacitors, component, etc. are important parts of the heat treatment system and are important to the success of the heat treatment process.

A known method to improve heat input using inductors moving relative to a component is to position a plurality of inductors around the component. However, sometimes the coupling distance between the inductors and the component cannot be set sufficiently identically, and this sometimes leads to extreme free forces between the component and the inductor, which, in the extreme case, can even lead to a component-inductor contact.

SUMMARY

It is therefore an aspect of the present disclosure to provide an induction hardening system in which a plurality of inductors are usable without an uneven behavior of the inductors occurring.

In the following an induction hardening system is presented for inductively hardening a component which system includes at least one heating device for heating the component, and wherein the heating device includes at least one inductor group that comprises at least two inductors that are designed to heat a to-be-hardened region on the component. Furthermore, the induction hardening system includes a drive unit that is designed to move the component along the at least two inductors.

In the case of multiple inductors, separate generators are usually required for each inductor in order to separately control the energy input for each inductor and to be able to compensate for possible concentricity inaccuracies in the inductive hardening, and thus to be able to compensate for a varying coupling distance between component and inductors. In addition, according to conventional teaching, only the use of separate generators allows an optimization of the generator power and frequency. The separate generators are usually supplied with energy from the same power grid, but modulate the respective current frequency, voltage and current intensity that is required or that is to be applied to the inductor separately for each inductor.

In contrast to this, in the present disclosure assigns each inductor group to a single generator that is designed to supply all inductors of the associated inductor group with a current of identical frequency, voltage, and strength.

Surprisingly it has been shown that with the use of a single generator for energizing all inductors of an inductor group, particularly symmetrical power conditions can be achieved between component and inductors. The reason for this is that asymmetrical coupling gaps during a movement of the component from the system center, and thereby also the risk of asymmetrical forces and a possible inductor-component contact, can be avoided. In addition, there can thereby be no more mutual influencing of magnetic fields of different frequency.

Here it is advantageous in particular to distribute the inductors of an inductor group symmetrically around the component, in particular to arrange them opposite each other.

Furthermore, energizing a plurality of inductors of an inductor group using a single generator has the advantage that a simple process control/NC program and a more robust process is possible with regard to possible variations in geometric differences of the individual inductors.

Due to the use of only a single generator per inductor group, a more robust process is also possible while operating at the limits. In particular, in combination with symmetrically or evenly distributed inductors of an inductor group, it can thereby be ensured that in the event of a failure or of a curtailment of the generator, no asymmetric forces act on the component. When, as in the past, a plurality of generators were provided for the inductors of an inductor group, a failure or a curtailment of a single generator of the plurality of generators would lead to one-sided forces on the component, and in the worst case with a one-sided switching off of an inductor, would risk contact between an inductor and the component.

In addition, the drive device, in particular its drive components in the form of rollers, or retaining components in the form of a chuck that moves the component relative to the inductors, is also spared from excessive wear, since no asymmetrical forces are to be expected on compensation/roller chuck, which would possibly no longer be controllable.

In addition, the hardening system is cost-effective overall, since due to the use of more cost-effective inductors (with regard to their precision and specifically in the lower power or diameter range), a cost-effective system is also achieved. Furthermore, the manufacturing quality of the inductors can be lower with a common generator (e.g. with a series connection of the inductors) since the same current flow is always set. Even with a parallel connection of the inductors, opposite-side influencing of the generators via the component cannot occur. A possible oscillation of a further generator can thus be avoided. In the prior art the different generators must be operated with different frequencies. However, if a plurality of inductor groups are provided, the generators associated with them should in turn be operated with different frequencies in order to avoid interference.

According to a preferred exemplary embodiment, the generator is designed to energize all inductors of the heating device so that the inductors are connected in parallel. An absolutely simultaneous energizing of the inductors can thereby be achieved, and thus any possible difference in the magnetic field frequency can also be avoided. Here the generator can have a generator output that is connected to all inductors of an inductor group by current supply lines so that all inductors of the inductor group are energized in parallel.

Alternatively the generator can also be designed to energize all inductors of the heating device in series so that the inductors are connected in series. This has the advantage that if the component is displaced out of the system center, a one-sided change of the oscillating circuit does not lead to an asymmetrical force or power displacement. Here the generator can have a generator output that is connected to a first inductor of an inductor group by a current supply line, and the first inductor and the subsequent inductors of the inductor group are designed to supply their subsequent inductors of the inductor group with current so that all inductors of the inductor group are energized in series.

A further advantage of the series connection is the possibility of using geometrically differently designed inductors and/or different coupling gaps without the individual current consumption changing. For example, a larger coupling gap on one side can change the energy introduced and the effective area of introduction on the component cross section. The advantage is in the influence on the active region and the introduction of energy without the need to change the inductor design or to provide a more complex process control (such as, for example, two-sided, simultaneous change of the coupling gap). As a further advantageous and cost-efficient variant, the inductors can have asymmetric geometries so that, for example, a simpler, straighter inductor that can be used on many different component geometries, and a more complex inductor that is adapted to the geometry of the component can be used within the same inductor group.

According to a further preferred exemplary embodiment, the inductors, in particular the inductors of an inductor group, are preferably uniformly distributed around the circumference of the component. The forces acting on the component are thereby preferably distributed evenly around the circumference so that an asymmetrical force introduction into the component does not occur.

Alternatively or additionally, the inductors of one or more inductor groups can be arranged in such a way on the component that different axial and or radial to-be-hardened regions of the component are heatable. This means that, for example, the inductors arranged around the component can be axially and/or radially offset so that different circumferential regions are heated. Furthermore, the inductors of one or more inductor groups also do not necessarily lie in the same plane, but rather can also be offset in height with respect to each other in order to heat different regions on the component.

It is thus possible, for example, to harden the raceways and the flange of a bearing ring by distributing one or more inductors, which harden the raceway, circumferentially around the bearing ring, while arranging another inductor or another inductor group to harden the flange. For this purpose the two groups of inductors can be evenly circumferentially distributed around the bearing ring but axially and/or radially offset relative to one another with respect to an axis of rotation of the component.

In particular with components with different thicknesses of the regions to be hardened, this allows for an optimized heat input on the respective region to be hardened despite use of a single generator for all inductors. Similarly, the coupling distance of the inductors can also be set differently.

According to a further preferred exemplary embodiment, an even number of inductors is provided that are distributed opposite one another on the component. The forces that act on the component can thereby be particularly well compensated for, since mutually opposing regions are acted upon with the same force.

Here it is preferred in particular that, in particular in the case of a parallel energizing, mutually opposing inductors of an inductor group are configured identically. Here, however, the inductors can nevertheless be disposed in different planes.

According to a further preferred exemplary embodiment, at least one inductor, preferably at least a pair of mutually opposing inductors, is configured as a straight inductor, or at least one inductor, preferably at least a pair of mutually opposing inductors, is configured as a curved inductor, in particular adapted to the geometry of the component. Here a straight inductor means that the inductor does not follow the curvature of the component in the circumferential direction and/or does not follow the curvature of the component in the axial direction and is embodied straight.

In contrast, a curved inductor follows the individual curvature of the component, or follows a rather universal curvature that is usable for different individual curvatures of different components. Such inductors must therefore be adapted to a curvature of the component itself, but they can be used universally for components with different curvature, circumference, or general design.

Furthermore, an induction hardening system is preferred in which the inductors in their entirety provide a complete covering of the region to be hardened that covers less than ¼ of the entire to-be-hardened region of the component, preferably less than 1/10 of the entire to-be-hardened region of the component, still more preferably less than 1/20 of the entire to-be-hardened region of the component.

Due to the small overlap or the shorter inductors in the circumferential direction, a defined coupling gap between component and inductor can be achieved. This coupling gap also varies slightly in its circumferential length so that no asymmetrical coupling gaps occur if the component is displaced from the system center, and the risk of asymmetrical forces and a possible contact between the inductor the component is thereby reduced.

Furthermore, the low overlap of the coupling gap can be defined more precisely in the cold state (adjustment process), which means that no asymmetric forces act on the component during the heating process.

According to a further advantageous exemplary embodiment, the component is a component with a closed curve, in particular an element of a plain or rolling-element bearing, a bearing ring, a gear, a roller, a journal, a bush, a disk, etc.

According to a further preferred exemplary embodiment, at least one inductor includes at least one energizable conductor that is configured to induce a changing magnetic field in a component in order to heat the component, wherein the conductor includes a first conductor section and a second conductor section that are each configured to face the component, wherein furthermore a current supply for energizing the first and the second conductor sections is disposed such that the first conductor section and the second conductor section are energized in parallel.

Alternatively at least one inductor is configured such that the inductor includes at least one energized conductor that is configured to induce a changing magnetic field in a component in order to heat the component, wherein the conductor includes a first conductor section and a second conductor section that are each facing the component, wherein furthermore a current supply energizing the first and the second conductor section is provided that is disposed such that the first conductor section and the second conductor section are energized in series.

Such a design of the inductors is advantageous in particular for larger components. A series circuit offers the advantage of a constant electrical current and a uniform heat introduction but with increased voltage requirements for the inductor. In contrast, a parallel circuit increases current requirements but uses a lower voltage. By such a selection the individual generator properties maximum current (Imax) and maximum voltage (Vmax) can be reacted to, and the induction hardening system can be optimized accordingly, even when only a single generator is used.

Further aspects of the invention relate to such designed inductors that are energizable in parallel or in series.

Further advantages and advantageous embodiments are specified in the description, the drawings, and the claims. Here in particular the combinations of features specified in the description and in the drawings are purely exemplary so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

FIGS. 1 to 4 schematically show a preferred exemplary embodiment of an inductive hardening system 100 that is configured as a pulse hardening system or as a progressive hardening system. In the depicted induction hardening system 100, a component 2, for example, the bearing ring depicted here, is supported on a work table 4, e.g., a rotating table, and can be traversed by induction coils 8-1, 8-2 with the aid of drive devices 6-1, 6-2, 6-3.

In order to securely fasten the component 2 to the work table 4 or to move the component 2, three drive devices 6-1, 6-2, 6-3 are respectively provided. The drive devices 6-1, 6-2, 6-3 can each include clamping jaws/rollers 10-1, 10-2, 10-3 that are displaceable in the radial direction and configured to hold the component 2 and/or optionally also to rotate the component if the work table is not a rotating table.

In the exemplary embodiment of the inductive hardening system 100, two inductors 8-1 and 8-2 are associated with an inductor group and are disposed opposite each other. It is of course also possible to use more than two inductors and/or more than one inductor group.

In particular, it is preferred to use an even number of inductors 8 per inductor group; the inductors 8 are disposed opposite each other and/or distributed evenly around the circumference of the component 2. The forces introduced by the inductors 8 of the corresponding inductor group into the component 2 can thereby be compensated for, since opposing forces cancel each other out. Here it is preferred in particular when opposing inductors 8 are configured identically.

Figure 1:
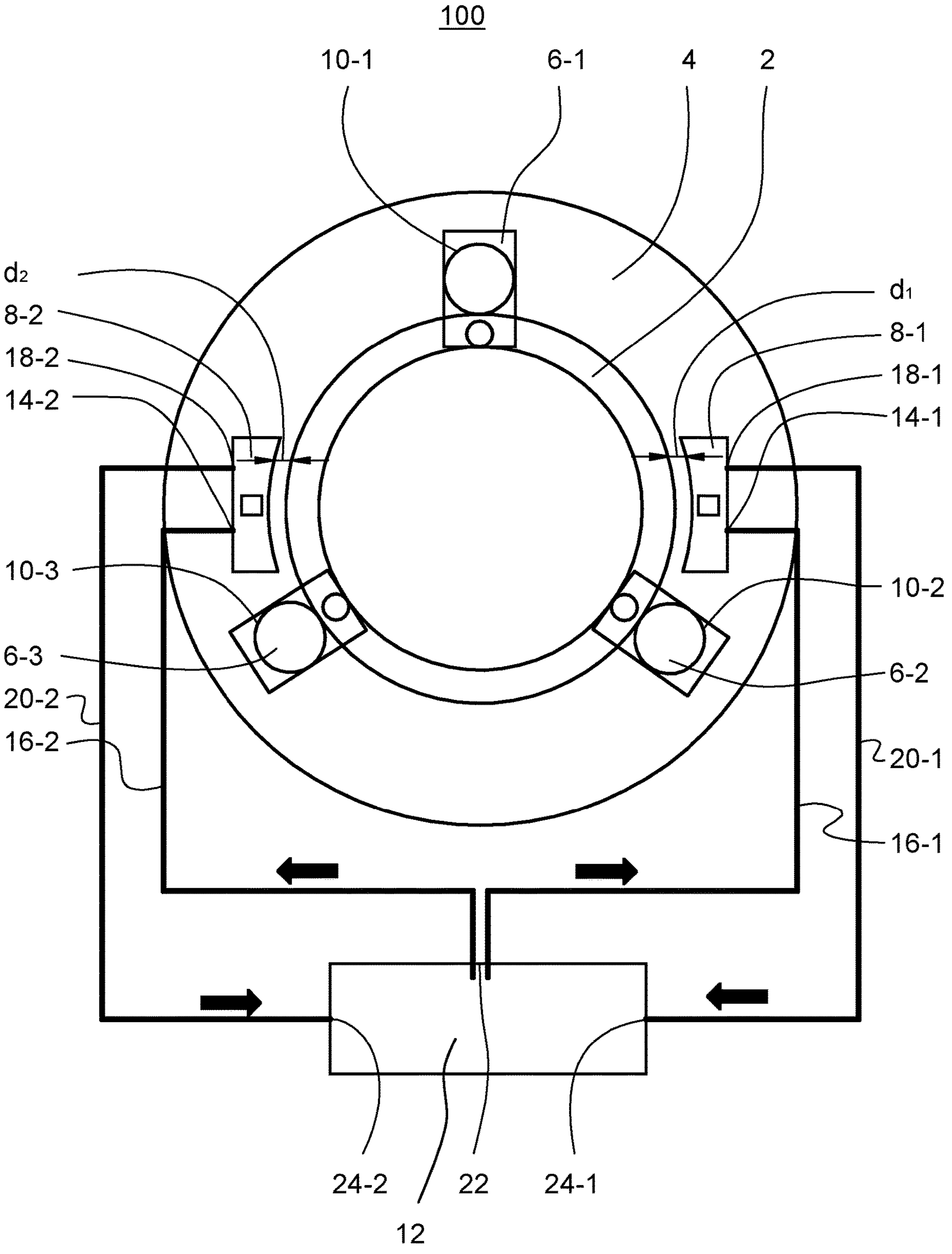
FIG. 1 is a schematic representation of an induction hardening system according to a first embodiment of the present disclosure.
Figure 3:
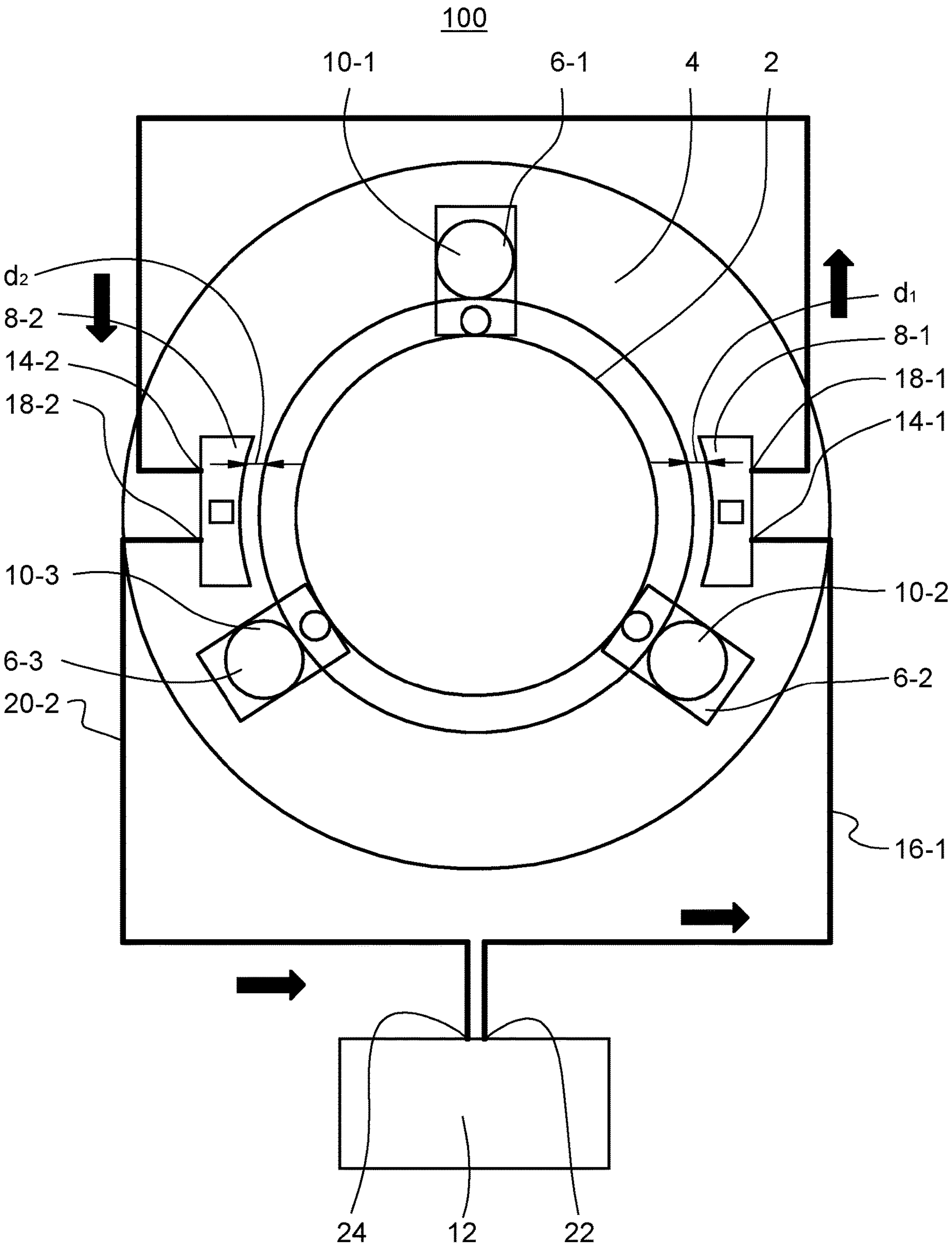
FIG. 3 is a schematic representation of an induction hardening system according to a third embodiment of the present disclosure.

As can furthermore be seen from FIGS. 1 and 3, the inductors 8-1, 8-2 are not arranged identically in the radial direction, with the result that a coupling distance d2, i.e., the distance between the inductor 8 and the component 2, of the inductor 8-2 is greater than the coupling distance d1 of the inductor 8-1. The inductors 8-1, 8-2 can additionally or alternatively also be disposed differently with respect to each other in the axial direction (into the drawing plane or out of it).

Figure 2:
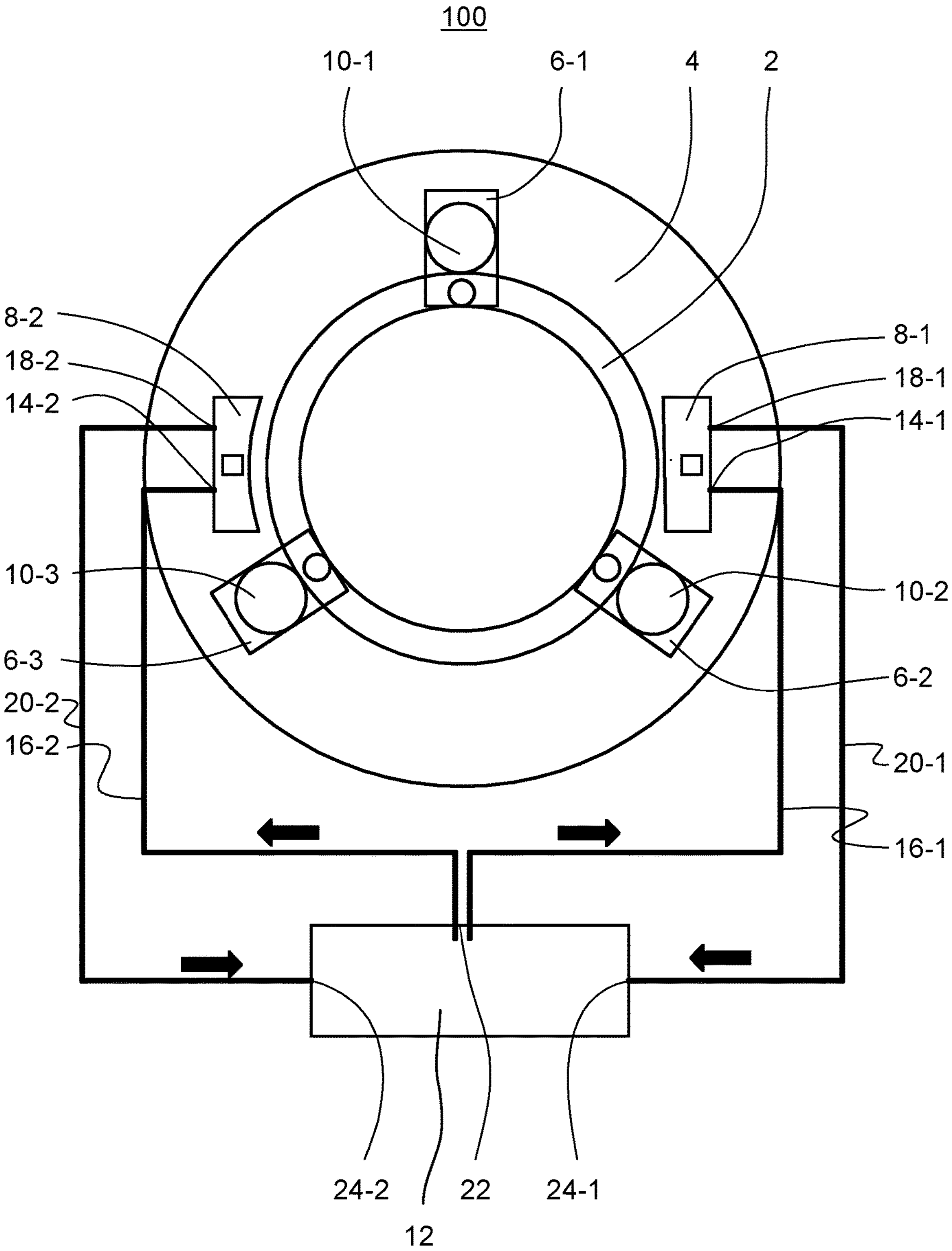
FIG. 2 is a schematic representation of an induction hardening system according to a second embodiment of the present disclosure.
Figure 4:
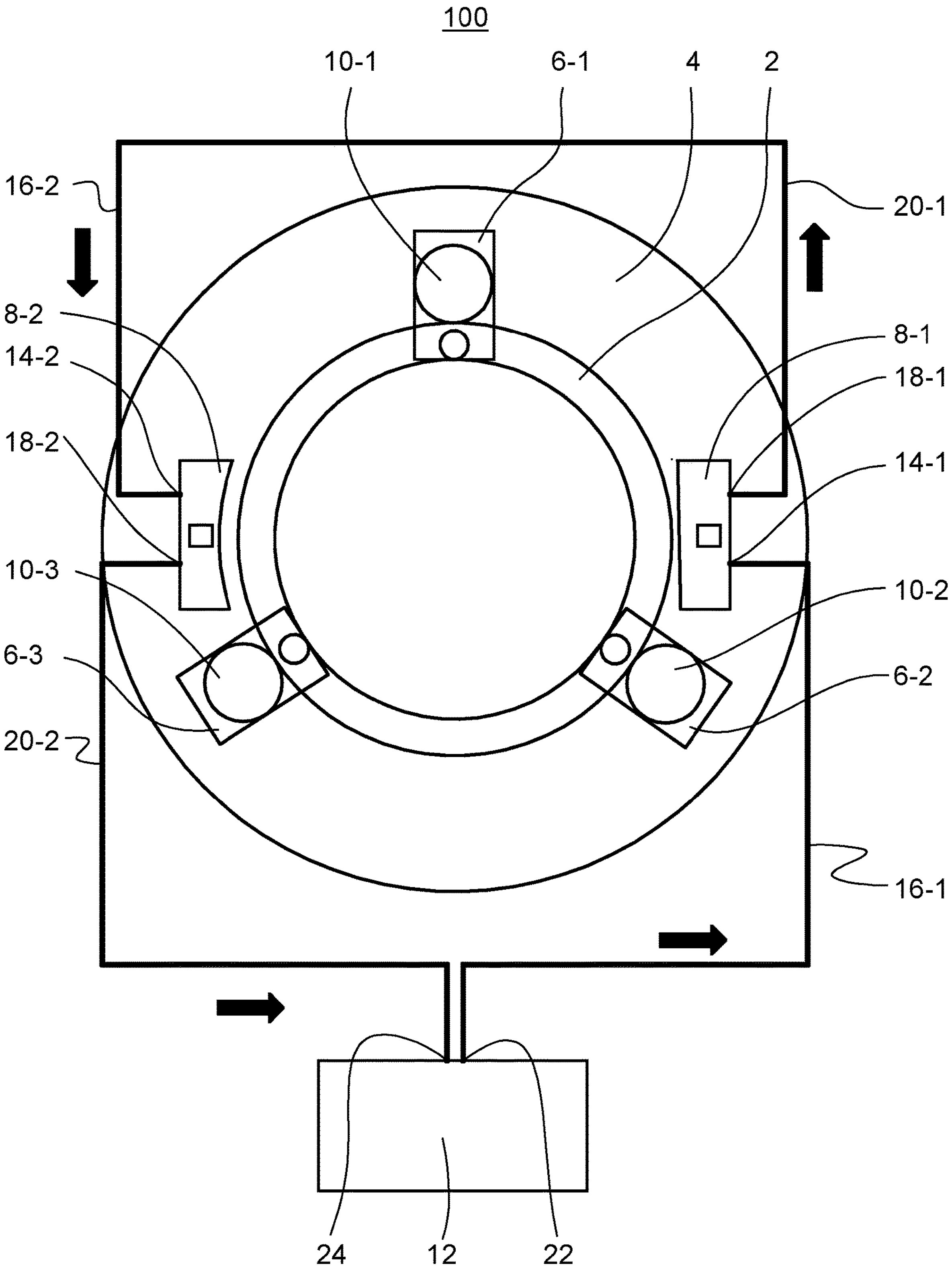
FIG. 4 is a schematic representation of an induction hardening system according to a fourth embodiment of the present disclosure.

Alternatively or in addition to different coupling gaps D1, D2, the inductors 8-1, 8-2 can also be configured differently geometrically, as shown in FIGS. 2 and 4. In these exemplary embodiments, the inductors 8-1 are each configured as straight inductors, i.e., inductors that do not follow the individual curvature of the component 2, while the inductors 8-2 are configured as curved inductors that are adapted to the curvature of the component 2.

In order to supply the inductors 8 with current of a certain frequency, voltage, and strength, the inductors are disposed in inductor groups with which a single generator 12 is furthermore associated that supplies all inductors 8 of the inductor group with alternating current of the same frequency, voltage, and strength. In the exemplary embodiments of FIGS. 1 to 4, only two inductors are shown that are associated with an inductor group, and are therefore supplied by a single generator 12 with current of equal frequency, voltage, and strength.

In the case of a plurality of inductors 8, separate generators would usually be necessary for each inductor 8-1, 8-2, in order to separately control the energy input for each inductor. In addition, according to conventional teaching, only the use of separate generators allows an optimization of the generator power and generator frequency.

Like the separate generators, the single generator 12 is also supplied with energy from a suitable electric grid; however, the single generator 12 modulates the current frequency and current strength required for the inductors 8 of the associated inductor group for all inductors in the same way.

With the use of a single generator 12 for energizing all inductors 8 of an inductor group, particularly symmetrical force ratios between the component 2 and the inductors 8 of the inductor group can be achieved. If a symmetrical distribution of the inductors 8 of the inductor group around the component is also provided, asymmetrical coupling distances (as shown in FIGS. 1 and 3) or differently designed inductors (as shown in FIGS. 2 and 4) will not produce asymmetrical forces or contact between the inductor and the component. In addition, there can thereby be no more mutual influencing of magnetic fields of different frequency.

Furthermore, the energization of several inductors 8 using only a single generator 12 has the advantage that a simpler process control/NC program and a more robust process with regard to possible variances in the coupling distance or a more robust process with regard to possible variances in geometric differences of the individual inductors 8 is possible.

Due to the use of only a single generator 12, a more robust process is also possible while operating at the limits. In particular, it can thereby be ensured that in the event of a failure or a curtailment of the generator 12, all inductors 8 will be currentless, or curtailed, so that no further forces will act on the component 2. With the use of a plurality of generators, as in the prior art, a failure or a curtailment of a single generator would lead to one-sided forces on the component 2 that in the worst cause contact between the component and the inductor.

In addition, the drive device 6, in particular its drive components in the form of rollers or retaining components 10, is also protected from excessive wear, since no asymmetrical forces are to be expected and no longer need to be compensated for.

With the use of a single generator 12, there are in principle two possibilities to integrate the inductors 8 into the current circuit provided by the generator 12. On the one hand, as shown in FIGS. 1 and 2, the inductors 8-1 and 8-2 can be energized in parallel. For this purpose the respective input 14-1, 14-2 of each inductor 8-1, 8-2 is connected to the generator 12 by a current supply line 16-1, 16-2. Furthermore, each current output 18-1, 18-2 of the inductors 8-1, 8-2 is also connected to the generator 12 by a current discharge line 20-1, 20-2. Here the plurality of current supply lines 16-1, 16-2 can be connected directly to a generator output 22 or branch off later from a common current line. In an analogous manner, the separate current discharge lines 20-1, 20-2 can be connected to a generator input 24-1, 24-2, or can combine upstream of the generator 12 into a common current line that is then in turn connected to the generator input 24.

Alternatively, as depicted in FIGS. 3 and 4, a series circuit of the inductors 8-1, 8-2 can also be realized. Then only an inductor, in the depicted case the inductor 8-1, is energized with current from the generator 12 wherein in this case the current supply line 16-1 connects the generator output 22 to the current input 14-1 of the inductor 8-1. Connected in series, the current discharge line 20-1 connected to the inductor output 18-1 of the first inductor 8-1 functions simultaneously as the current supply line 16-2 for the second inductor 8-2 and is connected to the current input 14-2 of the second inductor 8-2. The current output 18-2 of the second inductor 8-2 is then in turn connected via the current discharge line 20-2 to the input 24 of the generator.

Even if in FIGS. 1 to 4 only two inductors 8-1, 8-2 are depicted, the above-described energizing principle can also be used for a plurality of inductors.

Similarly, this means that it is possible to energize groups of inductors in parallel and to energize the inductors of the respective groups in series, or to energize groups of inductors in series and to energize the inductors of the respective groups in parallel.

Figure 5:
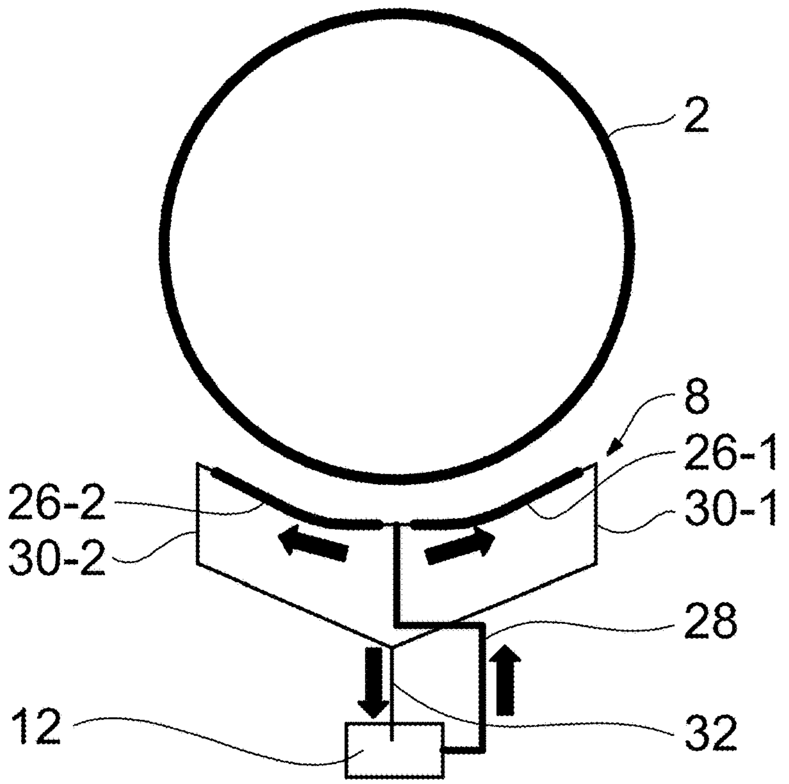
FIG. 5 is a schematic representation of a first embodiment of an inductor according to the present disclosure.
Figure 6:
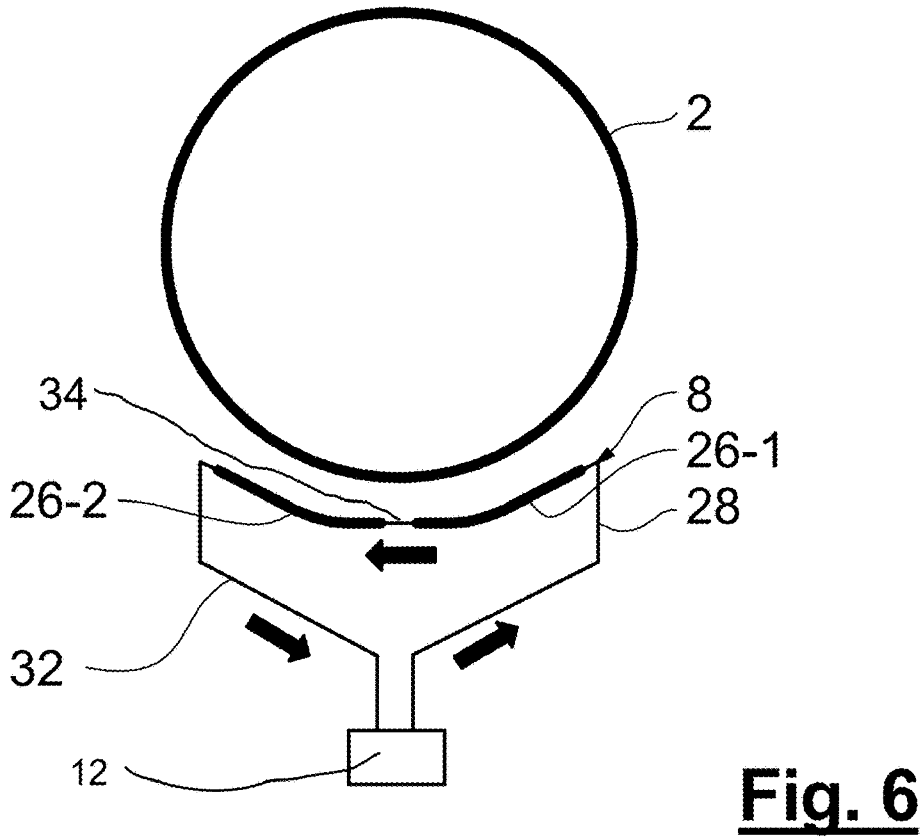
FIG. 6 is a schematic representation of a second embodiment of an inductor according to the present disclosure.

Furthermore, with large components 2 or correspondingly large inductors 8, the inductors 8 themselves can also be energized in parallel or in series. FIGS. 5 and 6 accordingly show a parallel energizing (FIG. 5) as well as a series energizing (FIG. 6) of an inductor 8. FIGS. 5 and 6 schematically show the arrangement of a large-surface inductor 8 along a component 2.

In the depicted exemplary embodiments, the inductor 8 includes an energized conductor 26 facing the component 2; the energized conductor 26 has a first conductor section 26-1 and a second conductor section 26-2. In the case of a parallel circuit of the conductor sections 26-1, 26-2, as depicted in FIG. 5, the two conductor sections 26-1, 26-2 are separately connected to a current supply line 28, which simultaneously supplies the conductor sections 26-1, 26-2 with current. At both conductor ends 30-1, 30-2 the current is also discharged again and guided out of the inductor 8 by a current discharge line 32.

In contrast, in the case of a series circuit (see FIG. 6), only one of the conductor sections, in the depicted case the conductor section 26-1, is coupled with the current supply 28, while the other conductor section 26-2 is merely coupled with the current discharge line 32. The conductor sections 26-1, 26-2 are mutually connected to each other by a connection 34 that simultaneously serves as the current discharge from the conductor section 26-1 and current supply for the conductor section 26-2.

The series circuit offers the advantage that coupling gap differences due to incorrect design of the inductors or poor execution quality, or cost-effective design of the inductors, do not lead to unequal currents in the conductor sections 26-1 and 26-2. Unequal currents would lead here to unequal energy transmission and unequal forces, which the coupling gap differences could in turn negatively influence.

Overall, the above-described induction hardening system makes possible a stable and reproducible induction hardening process with simple control in that only a single generator must be controlled. In addition, due to the equal current frequency and current strength at all inductors, a reduction of the warpage on the component is possible, since forces are uniformly coupled and the heat input is also equalized. This also allows a reduction of the processing additives and an avoidance of waste due to inductor-component contact, or meltings due to a locally too-high heat input. In addition, the novel energizing makes possible an avoidance or a reduction of the inductor wear.

A further advantage of a single generator per inductor group is the possibility to supply all inductors of the associated inductor group with identical frequency, current and voltage, and thus to be able to operate the process more uniformly and more stably. In the case of a plurality of generators, this is not possible due to the mutual influencing of the oscillating circuits.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved induction hardening systems.

Moreover, combinations of features and steps disclosed in the above detailed description may not be necessary to practice the invention in the broadest sense, and are instead taught merely to particularly describe representative examples of the invention.

Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

100 Induction hardening system
2 Component
4 Work table
6 Drive device
8 Induction coil
10 Clamping jaw
12 Generator
14 Induction coil current input
16 Current supply line
18 Induction coil current discharge
20 Current discharge line
22 Generator output
24 Generator input
26 Induction coil part
28 Current supply
30 Conductor end
32 Current discharge

What is claimed is:

1. An induction hardening system for inductively hardening a component, the induction hardening system comprising:
at least one inductor group including a first inductor group having at least two inductors configured to heat a region to be hardened on the component,
a drive unit configured to rotate the component along the at least two inductors, and
a generator,
wherein the at least two inductors of the first inductor group are electrically connected to the generator in parallel,
wherein the generator is configured to send a current of a same frequency and a same strength to the at least two inductors of the first inductor group, and
wherein the at least two inductors of the first inductor group include a first inductor and a second inductor opposing the first inductor across a space configured to receive the component while being induction hardened.

2. The induction hardening system according to claim 1, wherein the first inductor is a straight inductor and the second inductor is a curved inductor.

3. A system comprising:
an induction hardening system according to claim 1, and
the component mounted in the space,
wherein the component is ring-shaped and has a diameter.

4. The induction hardening system according to claim 3, wherein the inductors of the at least one inductor group together cover less than ¼ of a total surface area of the component.

5. The induction hardening system according to claim 3, wherein the inductors of the at least one inductor group together cover less than 1/10 of a total surface area of the component.

6. The induction hardening system according to claim 3, wherein the inductors of the at least one inductor group together cover less than 1/20 of a total surface area of the component.

7. The induction hardening system according to claim 3, wherein the component is a ring, a gear, a roller, a journal, or a bush.

8. The system according to claim 3, wherein a line on which the diameter lies passes through the first inductor and the second inductor.

9. The system according to claim 3, wherein the first inductor is spaced from the component by a first distance and the second component is spaced from the component by a second distance different than the first distance.

10. The system according to claim 3,
wherein the first inductor is structurally different than the second inductor.

11. The system according to claim 3,
wherein the first inductor is a straight inductor and the second inductor is a curved inductor.

12. The induction hardening system according to claim 1,
wherein the first inductor is spaced from the component by a first distance, and
wherein the second inductor is spaced from the component by a second distance different than the first distance.

13. An induction hardening system for inductively hardening a component, the induction hardening system comprising:
at least one inductor group including a first inductor group having at least two inductors configured to heat a region to be hardened on the component,
a drive unit configured to rotate the component along the at least two inductors, and
a generator,
wherein the at least two inductors of the first inductor group are electrically energized by the generator,
wherein the generator is configured to send a current of a same frequency and a same strength to the at least two inductors of the first inductor group, and
wherein the at least two inductors of the first inductor group are uniformly distributed around a circumference of the component.

14. An induction hardening system for inductively hardening a component, the induction hardening system comprising:
at least one inductor group including a first inductor group having at least two inductors configured to heat a region to be hardened on the component,
a drive unit configured to rotate the component along the at least two inductors, and
a generator,
wherein the at least two inductors of the first inductor group are electrically energized by the generator,
wherein the generator is configured to send a current of a same frequency and a same strength to the at least two inductors of the first inductor group,
wherein the at least two inductors of the first inductor group are connected to the generator in series,
wherein the first inductor of the at least two inductors of the first inductor group is spaced from the component by a first distance, and
wherein a the second inductor of the at least two inductors of the first inductor group is spaced from the component by a second distance different than the first distance.

* * * * *